July 28, 1936.  N. H. KLAGES  2,048,935
GLASS CUTTER
Filed March 30, 1935   3 Sheets-Sheet 1

INVENTOR
Norman H. Klages,
By Archworth Martin,
Attorney.

July 28, 1936.  N. H. KLAGES  2,048,935
GLASS CUTTER
Filed March 30, 1935   3 Sheets-Sheet 2
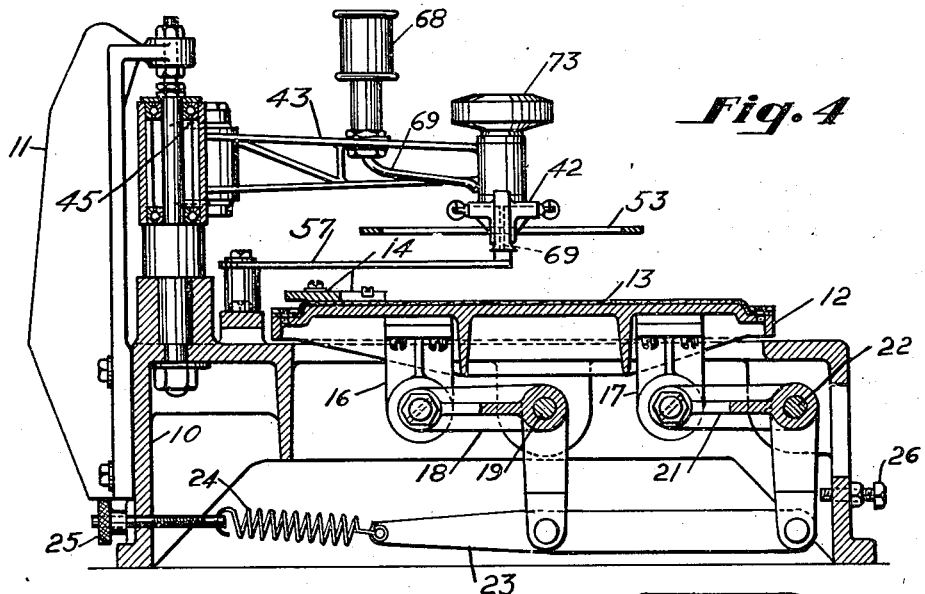
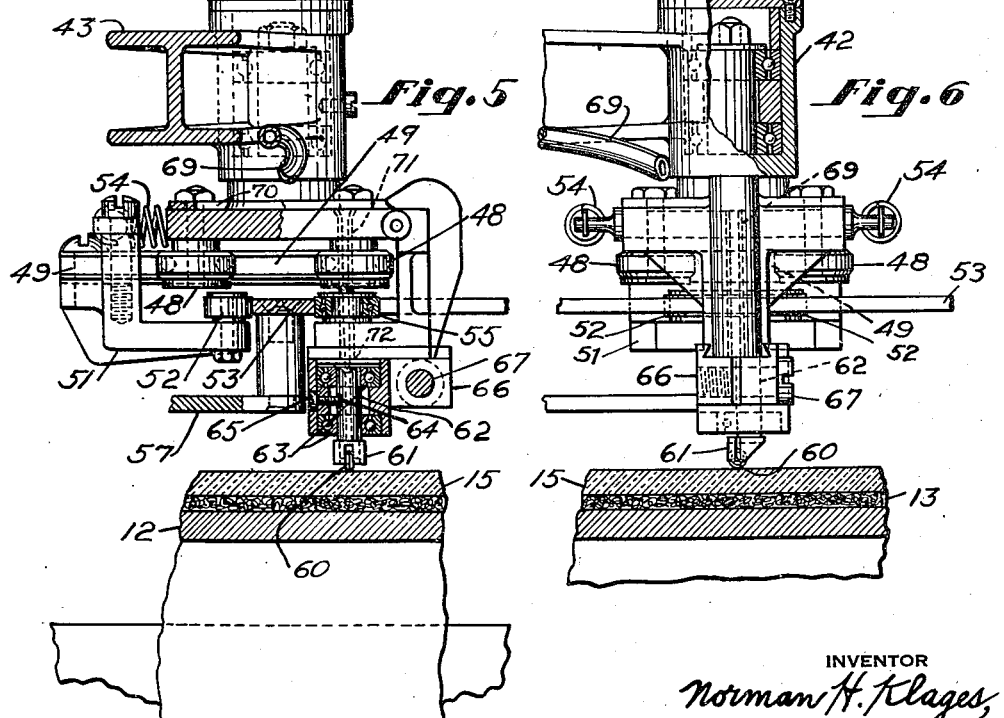
INVENTOR
Norman H. Klages,
By Archworth Martin,
Attorney.

July 28, 1936.　　　　N. H. KLAGES　　　　2,048,935
GLASS CUTTER
Filed March 30, 1935　　　3 Sheets-Sheet 3

INVENTOR
Norman H. Klages,
By Archworth Martin
Attorney.

Patented July 28, 1936

2,048,935

UNITED STATES PATENT OFFICE 2,048,935

GLASS CUTTER

Norman H. Klages, Pittsburgh, Pa., assignor to G. W. Klages & Son, Inc., Pittsburgh, Pa., a corporation of Pennsylvania Application March 30, 1935, Serial No. 13,926

14 Claims. (Cl. 33—27)

My invention relates to apparatus for cutting glass and similar substances by the use of a tool of the scoring type, which is employed to produce weakened lines or fractures in a sheet of glass.

One object of my invention is to provide a structure wherein the glass and the cutting tool are brought into cooperating relation in such manner that there is no danger of the glass being broken through excessive pressure of the cutting tool.

Another object of my invention is to provide a structure wherein only a predetermined cutting pressure can be applied to the cutting tool, any extraneous forces being transmitted to the frame of the structure.

Another object of my invention is to provide an improved manner for guiding a cutting tool along curved lines in various angular directions.

A further object of my invention is to provide an improved arrangement of template and cutter head.

Still another object of my invention is to provide a cutting apparatus of generally simplified and improved form.

Figure 1:
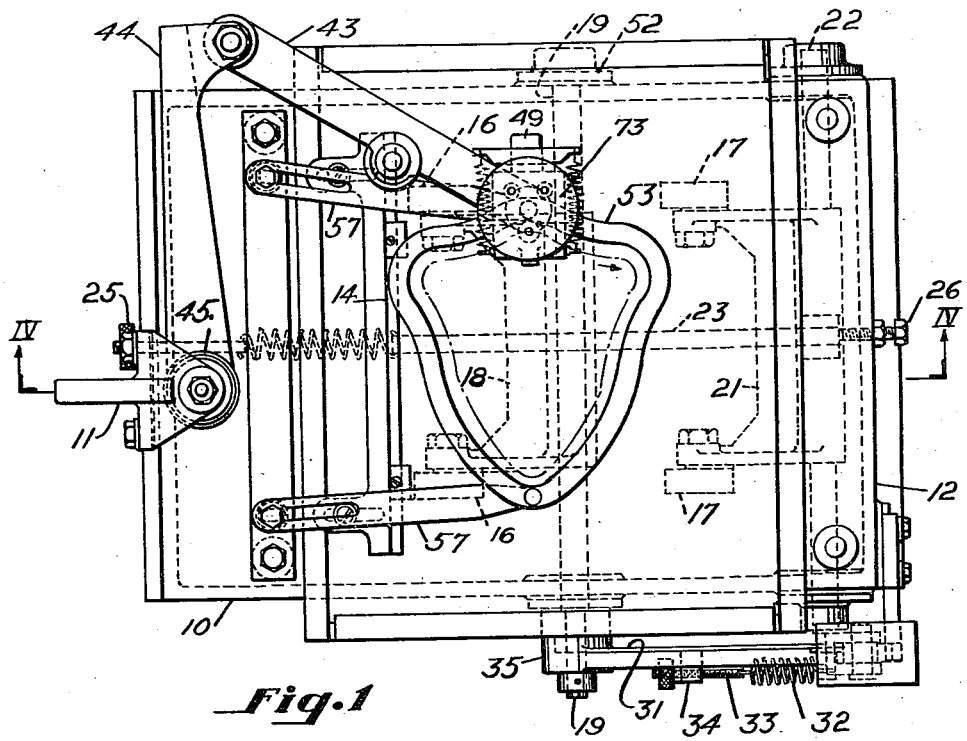
Figure 3:
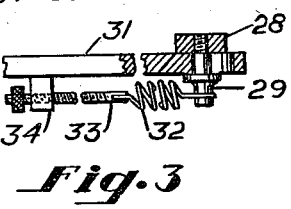
Figure 2:
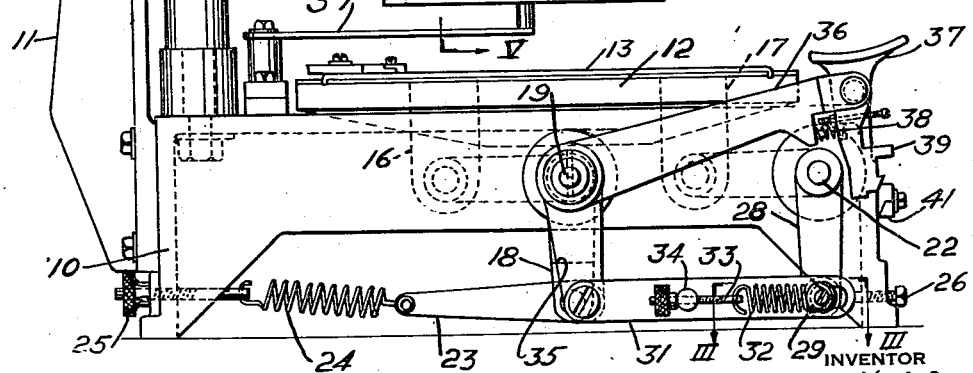
Figure 7:
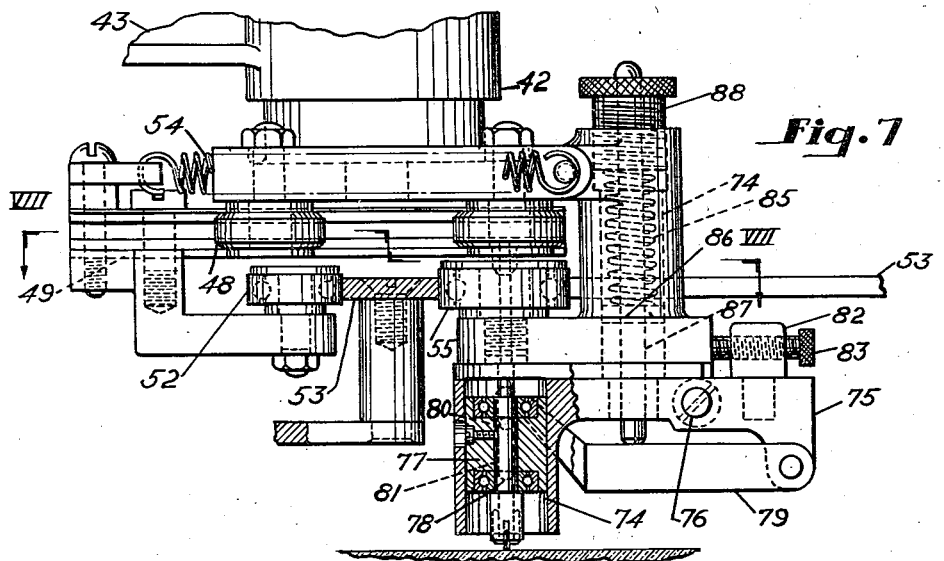
Figure 8:
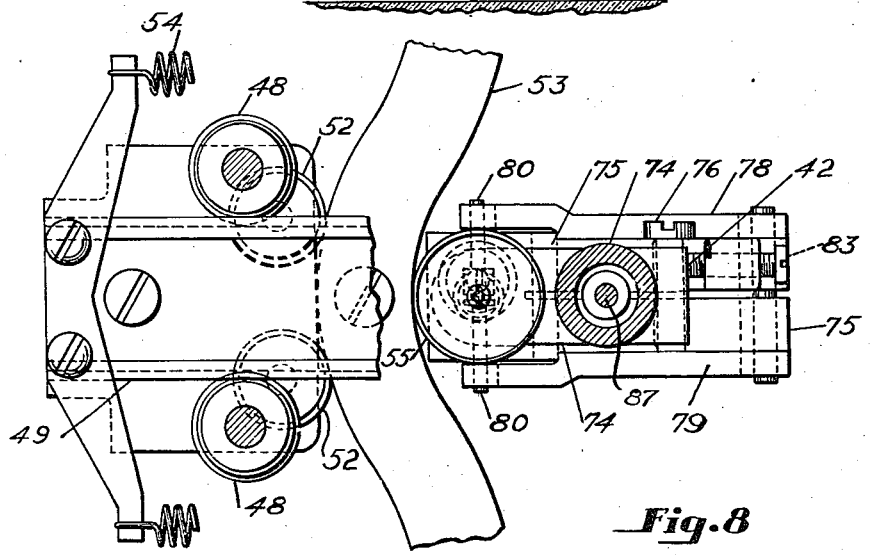
Figure 9:
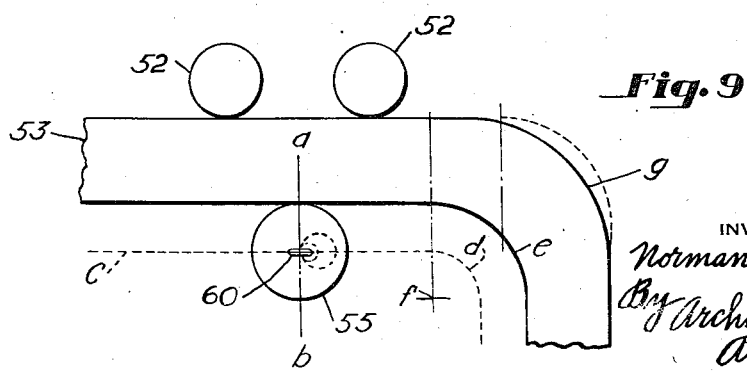

Some of the forms which my invention may take are shown in the accompanying drawings wherein Figure 1 is a plan view of a cutting or scoring machine; Fig. 2 is a side elevational view thereof; Fig. 3 is a view taken on the line III—III of Fig. 2; Fig. 4 is a view taken on the line IV—IV of Fig. 1; Fig. 5 is a view taken on the line V—V of Fig. 2, on an enlarged scale; Fig. 6 is a face view of the structure of Fig. 5, partially in section; Fig. 7 is a view similar to that of Fig. 5, but showing a modification of the mounting for the cutter; Fig. 8 is a view taken on the line VIII—VIII of Fig. 7, and Fig. 9 is a diagrammatic view showing the relation of the tracking rollers with the cut and the method of laying out the template therefor.

Referring first to Figs. 1 to 5, I show a base frame 10 having an upwardly-extending bearing bracket 11, and a lifting table 12 that is supported on the base frame 10, for vertical movement. The table 12 may be of metal or other suitable material and is here shown as provided with a pad 13 of felt, cork or the like, and aligning bars 14 for the edges of sheets of glass 15 that are to be cut.

Two pairs of downwardly-extending bracket members 16 and 17 are suitably secured by means of screws or otherwise to the underside of the table at spaced points, as shown more clearly in Figs. 1 to 3. The brackets 16 have pivotal connection with horizontal arms of a bell crank lever 18 that is secured to a shaft 19 which is journaled in the sides of the base 10. The brackets 17 likewise are pivotally connected to horizontal arms of a bell crank 21 that is secured to a shaft 22 which is journaled in the side walls of the base frame 10. A bar 23 is pivotally connected to the lower ends of the bell crank levers 18 and 21, and a spring 24, which is adjustably tensioned by a thumb nut 25, serves to partially counterbalance the weight of the table, since it exerts a pulling force on the bar 23 that tends to rock the bell crank levers in a clockwise direction to raise the table. An adjustable stop screw 26 is provided in the front wall of the base 10 so as to be engaged by the depending leg of the bell crank lever 21, and permit of limiting the extent of downward movement of the table 12.

The shaft 22 has secured to its one end a crank 28 that has a pin 29 which extends through an elongated slot in a bar 31. A spring 32 has engagement at its front end with the pin 29, so as to yieldably hold said pin against the inner end of the said slot. The other end of the spring is connected to an adjustable screw 33 which has threaded engagement with a lug 34 that is carried by the bar 31. A bell crank lever 35 is loosely journalled on the end of the shaft 19 and has pivotal connection at its lower end with the bar 31. The bell crank lever 35 has a handle or lever extension 36 which carries a latch lever 37 that is pivotally mounted thereon, a spring 38 being provided for yieldably urging the latch lever in a counter-clockwise direction.

It will be seen that when the member 37 is depressed, the bell crank lever 35 will be rocked in a clockwise direction, thus drawing the bar 31 and the spring 32 to rock the crank arm 28 in the same direction. The spring 32 is normally tensioned to such degree that it will exert sufficient pulling force on the crank arm 28 to rock the shaft 22 and cause the brackets 16 and 17 and the table carried thereby to be elevated through the connections heretofore described.

The extent, of course, to which the table and a sheet of glass carried thereby (Figs. 5 and 6) will be raised depends upon the range of movement of the bell crank 35. However, before the limit of movement of the bell crank 35 is reached, the glass sheet engages the cutting tool, so that further movement of the bell crank places the spring 32 under tension.

This tensioning of the spring, therefore, applies predetermined cutting or scoring pressure between the glass sheet and the cutting tool. The degree of cutting pressure can be readily adjusted by adjusting the screw 33 to increase or decrease the tension of the spring 32. The cutting pressure is independent of any force exerted on the latch lever 37, because the lost-motion connection between the bar 31 and the arm 28 transmits lifting force to the table only equal to the tension set on the spring 32. Thus, application of excessive pressure sufficient to cause breakage of the glass is eliminated.

Depressive movement of the latch lever 37 is limited by a stop shoulder 39 that engages a stop lug 41, on the frame 10. The stop members are so positioned that the lever 36 cannot be moved down so far that the lost motion between the pin 29 and the bar 31 will be taken up. The spring 38 serves to hold the latch lever 37 in latching engagement with the underside of the stop member 41. In order to release the latch, the lever 37 is rocked slightly in a clockwise direction, whereupon the weight of the table will rock the bell cranks 18, 21, and 35 in counterclockwise directions.

A cutter head 42 is pivotally supported upon a jointed arm consisting of sections 43 and 44, the inner member 44 being journaled at 45 in the bearing bracket 11. The arms 43 and 44 are freely swingable relative to one another about the axis of the bearing 45.

The cutter head 42 carries four guide rollers 48 between which a slide bar 49 may be moved, the bar being channeled or grooved so as to have guiding engagement with the rollers 48. The bar 49 carries at its outer end a bracket 51 that has mounted thereon a pair of guide rollers 52 for engagement with the periphery of a template 53. A pair of springs 54 serve to yieldably hold the slide in contracted position, so that the rollers 52 at the outer periphery of the template and a guide roller 55 at the inner side of the template will be yieldably held in contact with the template. The roller 55 is mounted on the cutter head 42 on a suitable stud shaft, opposite to the rollers 52, as shown more clearly in Fig. 5.

The template 53, on its inner periphery, is given a contour corresponding to the contour of the glass plate which it is desired to produce, the cutter or scoring tool as hereinafter described following a path paralleling and in fixed dimensional proximity to the inner periphery of the template, as shown in Fig. 1. The template is secured to the base frame 10 by bracket arms 57, that are offset in a plane below the template, as shown more clearly in Fig. 2, so as not to interfere with the movement of the cutter head and the guide rollers around the template. The contours of the inner and outer peripheries of the template are arranged in parallelism, except at points where a cut is to be made on a sharply curved line of small radius, as hereinafter described.

A cutting or scoring tool 60 is mounted on the cutter head, as shown more clearly in Figs. 5 and 6. The element 60 may be in the form of a disc or a cutting wheel which is rotatably mounted in a holder 61 on the lower end of a cutter shaft 62. The shaft 62 may be of tubular form and extends through anti-friction bearings 63, the periphery of the shaft 62 being indented or flattened as indicated at 64 for the reception of the inner end of a retaining screw 65 that will permit partial rotation of the shaft 62, but will prevent axial displacement thereof in the bearings 63.

As shown more clearly in Fig. 6, the central point of the cutter 60 is offset with respect to the axis of the shaft 62, so that the cutter can swivel after the manner of a caster, and therefore more readily follow the curved contours of the template at points where changes in direction of cutting occur, thereby maintaining tangency of the cutter at such points. The cutter shaft and its bearing 63 are mounted in a bearing block 66 that has dovetailed engagement with the lower end of the cutter head assembly. The block 66 is partially slit longitudinally and is adjustably clamped on the cutter head by a screw 67, so as to permit of convenient changes of cutter without disturbing the other parts of the movable head, and to permit adjustment of the cutter 60 in directions radially of the inner periphery of the template.

An oil cup 68 supplies oil through a pipe 69 to an annular channel 70 in the cutter head 42 (Fig. 5), the oil flowing from the channel 70 to the upper end of a conduit 71 that communicates with the funnel-like upper end 72 of the hollow shaft 62, the lower end of the shaft discharging the oil to the cutter 60.

A handle or grip member 73 is provided for the cutter head and is journaled in the outer end of the arm 43, so that with the guide rollers 52 and 55 in contacting engagement with the edges of the template, 53 and the table raised to hold the glass 15 in engagement with the cutter, movement of the cutter 60 along the template in a clockwise direction (Fig. 1), will cause the cutter to score or cut the glass sheet. One revolution around the template will be sufficient to cut the glass and to permit the outer portions of the glass to be broken away along the score line, leaving the completed glass article with the desired contour.

Referring now to Figs. 7 and 8, I show a structure that is somewhat similar to the structures of Figs. 1 to 6, but wherein means are provided for yieldably urging the cutter into contact with the glass, instead of the table being yieldably urged against the cutter. With this structure, a table will be provided preferably having vertical movement, but wherein the spring and lost-motion connection at 29 and 32 may be eliminated, the table being rigidly held in its uppermost position.

The cutter head 42 of Fig. 7 may be substantially identical with the cutter head 42 of the other figures, but such cutter head is provided with a vertically-extending bore or well 74. A partially slitted bearing block 75 has dovetail connection with the cutter head and is held in assembled relation thereon by a clamping screw 76, as is the block 66 of Fig. 5. The bearing block 75 slidably supports a bearing housing 77 for the cutter shaft or spindle 78, the housing 77 and the spindle 78 being vertically movable as a unit, in the bearing block 75.

A yoke plate 79 is pivotally mounted at its outer end upon the bearing block 75 and, at its inner end, the arms of the yoke bear on pins 80 which are driven into the housing 77. The pins 80 extend through vertical slots 81 in the opposite sides of the bearing block 75. The bearing block 75 has a threaded boss 82 and a set screw 83, extending therethrough. By adjustably positioning the set screw 83 against the cutter head 42, the position of the cutter 84 is adjusted in directions radially of the template 53.

The plate 79 is yieldably urged downwardly by a spring 85 that is disposed within the well 74 and seats at its lower end against a shoulder or flange 86 on a pin 87, the lower end of the pin engaging the plate 79. The spring 85, at its upper end, seats against the underside of a thumb nut 88, which is threaded into the bore 74, so that the compression of the spring 85 and consequently the pressure exerted by the cutter 84 on the glass is readily adjustable, as desired.

The use of the yieldably-disposed cutter of Fig. 7 is particularly desirable where the larger pieces of glass are to be cut, and consequently a heavier table is required, because the inertia to vertical movements under scoring pressures is so great that there would be danger of breaking the glass if the table did not yield readily when the cutter passed over an irregularity in the glass surface. Furthermore, the scoring pressure is more uniform and more accurately controlled to obtain proper cutting, since such inertia of the table is eliminated, thereby preventing any sudden increase in scoring pressure. In the case of lighter work, the structure of Figs. 1 to 6 is very satisfactory because the table will yield readily when the glass is being scored.

It will be seen that the size of the cut-out object having a contour determined by the shape of the inner periphery of the template is determined by the spacing of the cutting wheel from the inner edge of the template, and that similar objects of a different size can be easily cut-out simply by adjustment of the cutter supporting block on the cutter head assembly.

Since none of the cutting pressure is imposed on the template, but is transmitted to the frame through the sections 43—44, there is no likelihood of shifting of the template during a scoring operation, nor is the cutting pressure affected by depressive force applied to the handle 73 because the cutter head is rigidly supported against deflection out of a given plane by the sections 43—44. Moreover, the triangularly-arranged guide wheels engaging the template cause the cutter to follow accurately the form of the template and the single inner roller permits cutting of the glass on curves of small radius.

As shown in Fig. 9, the path of the cutter 60, as indicated by the dotted line c, parallels the inner periphery of the template, and preferably the cutter is disposed in alignment with the vertical axis of the roller 55. In order to effect cutting of the glass on a sharply curved line having a radius less than the diameter of the roller 55, for example, on a curve such as d, the outer periphery of the template is given a curvature g having a predetermined relation to the curvature of the inner periphery of the template, so that tangency of the cutter is maintained relative to the desired line of cut during turning movement of the cutter head at such curve. Since the curve d and the curve e of the template are arranged in parallelism, they are struck from a common center, as at f. The curve g, instead of being struck from the center f with a radius equal to the distance from the center f to the outer edge of the template, is formed with a smaller radius. For practical purposes, the radius of the curve g can be equal to the width of the template plus the radius of the curve d.

With the outer curvature of the template formed in the above described manner, the width of the template opposite to the curve d will be increased, whereby the spaced outer rollers 52 will be properly supported and turning movement of the cutter head effected in a manner to maintain tangency of the cutter 60 with the line of cut d. Thus, back-tracking the cutter or movement thereof out of tangency to the line of cut with consequent scratching and marring of the glass is eliminated. Ordinarily, if the outer and inner curves of the template were parallel opposite such a curve d, the cutter head would be liable to pivot at the point of contact between the roller 55 and the inner periphery of the template, since the leading roller 52 would be unsupported by the template as it entered the curve, thereby causing rearward movement of the cutter.

The purpose of the outer contour of the template is to maintain tangency of the cutter by maintaining the axis of the cutter, as indicated by the line a—b, approximately at right angles to the line of cut c.

I claim as my invention:—

1. Cutting apparatus for sheet material, comprising a template of irregular ring-like form, a pair of guide rollers engaging one edge of the template, a third guide roller engaging the other edge of the template, means for yieldably holding the rollers against the edges of the template, and a cutter holder associated with the said third roller, one edge of the template being of a contour which determines the area and shape of the article to be cut from said material and the other edge thereof being of a contour which will maintain approximately proper tangency with respect to desired curved lines of cutting.

2. Cutting apparatus for sheet material, comprising a template of irregular ring-like form, a pair of guide rollers engaging the outer edge of the template, a third guide roller engaging the inner edge of the template, means for yieldably holding the rollers against the edges of the template, and a cutter holder associated with the said third roller, the inner edge of the template being of a contour which determines the area and shape of the article to be cut from said material and the outer edge thereof being of a contour which will maintain approximately proper tangency with respect to desired curved lines of cutting.

3. Cutting apparatus for sheet material, comprising a table, a ring-like template above the table, a cutter head above the table, a pair of guide rollers carried by the head and engaging one edge of the template, a third guide roller engaging the other edge of the template, means for yieldably holding the rollers against the template, and a cutter holder carried by the head, in radially-fixed relationship to the said third roller, the second-named edge of the template being of a contour which determines the area and shape of the article to be cut, and the first-named edge of the template being of such contour that the cutter holder is directed in approximately proper tangency with respect to desired curved lines of cutting.

4. Cutting apparatus for sheet material, comprising a table, a template of ring-like form disposed in a plane spaced above the table, a cutter head above the template, guide rollers carried by the cutter head and engaging the inner and the outer edges of the template, a cutter carried by the cutter head and disposed in a plane below the template, and means for supporting the template at such points that the cutter head together with the guide rollers and the cutter may be moved throughout the entire circumference of the template.

5. Cutting apparatus for sheet material, comprising a template of ring-like form, a cutter head, guide members carried by the cutter head and engaging the inner and outer edges of the template, a cutter carried by the said head, and means for supporting the template at such points that the cutter head together with the guide rollers and the cutter may be moved throughout the entire circumference of the template.

6. Cutting apparatus for sheet material, comprising a template of ring-like form, a cutter head, guide members carried by the cutter head and engaging the inner and outer edges of the template, a cutter carried by the said head, and means independent of the cutter head for supporting the template at such points that the cutter head together with the guide rollers and the cutter may be moved throughout the entire circumference of the template.

7. Cutting apparatus for sheet material, comprising a table, a template of ring-like form disposed in a plane spaced above the table, a cutter head above the template, guide rollers carried by the cutter head and engaging the inner and outer edges of the template, means for yieldably urging said rollers into engagement with the edges of the template, a bracket supported from a point adjacent to an edge of the table and at its inner end having supporting engagement with the lower side of the template, and a cutter disposed in a plane below the template, adjacent to the inner periphery thereof.

8. Cutting apparatus for sheet material, comprising a table, a template of ring-like form disposed in a plane spaced above the table, a cutter head above the template, guide rollers carried by the cutter head and engaging the inner outer edges of the template, means for yieldably urging said rollers into engagement with the edges of the template, a bracket supported from a point adjacent to an edge of the table and at its inner end having supporting engagement with the lower side of the template, and a cutter disposed in a plane below the template, adjacent to the inner periphery thereof, the cutter being supported on a vertical axis that is co-incident with the axis of the guide roller at the inner periphery of the template.

9. Cutting apparatus for sheet material, comprising a table, a template of ring-like form disposed in a plane spaced above the table, a cutter head above the template, guide rollers carried by the cutter head and engaging the inner and outer edges of the template, means for yieldably urging the said rollers into engagement with the edges of the template, a bracket supported from a point adjacent to an edge of the table and at its inner end having supporting engagement with the lower side of the template, and a cutter disposed in a plane below the template, adjacent to the inner periphery thereof, the cutter being supported on a vertical axis that is co-incident with the axis of the guide roller at the inner periphery of the template, and having swivelling movement about said axis.

10. Cutting apparatus for sheet material, comprising a table, a template of ring-like form disposed in a plane spaced above the table, a cutter head above the template, a pair of guide rollers carried by the cutter head and engaging one edge of the template, a guide roller carried by the cutter head and engaging the other edge of the template, means carried by the said head for yieldably urging the said pair of rollers against the template, and a castor-like cutter support unitarily associated with the other roller.

11. Cutting apparatus for sheet material, comprising a table, a template having an annular contour, a cutter head, guide members carried by the said head and having engagement with the template, and a cutter mounted on the cutter head for adjustment radially of the template.

12. Cutting apparatus for sheet material, comprising a base, bell crank levers journaled in said base, a work-supporting table connected to an arm of each of said bell cranks, an operating lever, a yieldable connection between said lever and the bell cranks for operating the bell cranks to raise the table, and a cutter head positioned above the table in position to be engaged by a work piece on the table.

13. Cutting apparatus for sheet material, comprising a base, bell crank levers journaled in said base, a work-supporting table connected to an arm of each of said bell cranks, an operating lever, a yieldable connection between said lever and the bell cranks for operating the bell cranks to raise the table, a cutter head positioned above the table in position to be engaged by a work piece on the table, and means positively limiting the range of table-lifting movement of the said lever.

14. Cutting apparatus for sheet material, comprising a cutter head, a table, lifting members for said table, an operating lever for actuating the lifting members, a yieldable connection between the lever and said members, a stop member for limiting movement of the lever in a direction to lift the table, and a latch for releasably maintaining the lever at said limit of movement.

NORMAN H. KLAGES.